United States Patent
Anand et al.

(10) Patent No.: US 8,995,277 B2
(45) Date of Patent: Mar. 31, 2015

(54) METHOD FOR DYNAMIC LOAD BALANCING OF NETWORK FLOWS ON LAG INTERFACES

(71) Applicant: Telefonaktiebolaget L M Ericsson (Publ), Stockholm (SE)

(72) Inventors: Prashant Anand, Bangalore (IN); Arun Balachandran, Bangalore (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 155 days.

(21) Appl. No.: 13/664,192

(22) Filed: Oct. 30, 2012

(65) Prior Publication Data

US 2014/0119193 A1    May 1, 2014

(51) Int. Cl.
*H04J 1/16*     (2006.01)
*H04L 12/703*   (2013.01)
*H04L 12/803*   (2013.01)
*H04L 12/707*   (2013.01)
*H04L 12/709*   (2013.01)

(52) U.S. Cl.
CPC .............. *H04L 47/125* (2013.01); *H04L 45/22* (2013.01); *H04L 45/245* (2013.01); *H04L 45/28* (2013.01)
USPC .......................................................... 370/237

(58) Field of Classification Search
CPC .............................. H04L 47/122; H04L 47/125
USPC .......................................................... 370/237
See application file for complete search history.

(56) References Cited

U.S. PATENT DOCUMENTS

| | | | |
|---|---|---|---|
| 2008/0198746 A1* | 8/2008 | Kwan et al. | 370/231 |
| 2008/0232521 A1* | 9/2008 | Rodbro et al. | 375/354 |
| 2009/0238211 A1* | 9/2009 | DeCusatis et al. | 370/498 |
| 2011/0090789 A1* | 4/2011 | Fung | 370/230 |
| 2011/0090797 A1* | 4/2011 | Beecroft | 370/237 |
| 2011/0096665 A1* | 4/2011 | McCann et al. | 370/235 |
| 2011/0164496 A1* | 7/2011 | Loh et al. | 370/230 |
| 2012/0207024 A1* | 8/2012 | Kohn et al. | 370/235 |
| 2013/0142114 A1* | 6/2013 | Ault et al. | 370/328 |
| 2013/0223336 A1* | 8/2013 | Lindner | 370/328 |

* cited by examiner

*Primary Examiner* — Hassan Kizou
*Assistant Examiner* — Ashil Farahmand

(57) ABSTRACT

A method is implemented by a network element to improve load sharing for a link aggregation group by redistributing data flows to less congested ports in a set of ports associated with the link aggregation group. The network element receives a data packet in a data flow at an ingress port of the network element. A load sharing process is performed to select an egress port of the network element. A check is whether the selected egress port is congested. A check is made whether a time since a previous data packet in the data flow was received exceeds a threshold value. A less congested egress port is identified in the set of ports. A flow table is updated to bind the data flow to the less congested egress port and the data packet is forwarded to the less congested egress port.

19 Claims, 4 Drawing Sheets

METHOD FOR DYNAMIC LOAD BALANCING OF NETWORK FLOWS ON LAG INTERFACES

FIELD OF THE INVENTION

The embodiments of the invention relate to a method and system for load balancing. Specifically, the embodiments relate to a method and system for redistributing data flows over a link aggregation interface to improve throughput.

BACKGROUND

Link aggregation is a term utilized in the field of computer networking to describe processes for using multiple network connections (i.e., links) in parallel (i.e., in an aggregated manner) to increase the throughput of a network element. Use of multiple network connections in place of a single connection provides a higher throughput than the single connection could sustain. The use of link aggregation also provides redundancy in case one of the links fails. The throughput may be diminished in the case of a single link failure, but the connectivity will not be lost because the other links continue to service the communication between a source and destination node where link aggregation is supported.

Link aggregation, as described in the Institute of Electrical and Electronics engineers (IEEE) standard 802.3ad, binds multiple physical ports of a network element into a single, larger capacity logical port called a Link Aggregation group (LAG). The interface between the incoming data flows and the LAG in a particular network element can be referred to as a LAG interface. A LAG can service any number of data flows (i.e., a set of related data packets typically between a specific source node and destination node). Usually, the data flows are distributed across the constituent links of a LAG interface by a hashing function. The input to the hash function is an N-tuple, which is derived from some fixed attributes of the packets like level two and level 3 (L2/L3) header fields. Where level two and level three refer to the open systems interconnection (OSI) model. Once a data flow is bound to an output port of a LAG, it remains associated with it until the time it is active. The hashing method and fixed data flow output port binding ensures that there is no packet re-ordering due to transmission over the aggregated interface.

SUMMARY

In one embodiment, a method is implemented by a network element to improve load sharing for a link aggregation group by redistributing data flows to less congested ports in a set of ports associated with the link aggregation group. The network element receives a data packet in a data flow at an ingress port of the network element. A load sharing process is performed to select an egress port of the network element. A check is whether the selected egress port is congested. A check is made whether a time since a previous data packet in the data flow was received exceeds a threshold value. A less congested egress port is identified in the set of ports. A flow table is updated to bind the data flow to the less congested egress port and the data packet is forwarded to the less congested egress port.

In another embodiment, another method is implemented by a network element to improve load sharing for a link aggregation group by redistributing data flows to less congested ports in a set of ports associated with the link aggregation group. In this method the data packet is received in a data flow at an ingress port of the network element. A load sharing process is performed to select an egress port of the link aggregation group. A check is made whether the identified egress port is congested using a congestion monitoring database. A check is made whether a difference between a current time and a time stamp of a previous data packet in the data flow exceeds a threshold value. A new egress port is selected from the set of ports of the link aggregation group using congestion monitoring data. A flow table is updated to bind the data flow to the new egress port and the data packet is forwarded to the new egress port of the link aggregation group.

In one embodiment, a network element improves load sharing for a link aggregation group by redistributing data flows to less congested ports in a set of ports associated with the link aggregation group. The network element includes a first line card including a set of ports configured as part of the link aggregation group, a switch fabric coupled to the first line card, the switch fabric configured to enable communication between line cards of the network element, and a second line card coupled to the switch fabric, the second line card including a set of ports, a L2 and L3 processor and a fabric access processor. The set of ports are configured to receive a data packet in a data flow. The L2 and L3 processor are configured to perform a load sharing process to select an egress port of the link aggregation group, to check whether the identified egress port is congested using a congestion monitoring database, to check whether a difference between a current time and a time stamp of a previous data packet in the data flow exceeds a threshold value, to select a new egress port in the set of ports of the link aggregation group using congestion monitoring data, and to update a flow table to bind the data flow to the new egress port. The fabric access processor is configured to forward the data packet to the new egress port of the link aggregation group.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
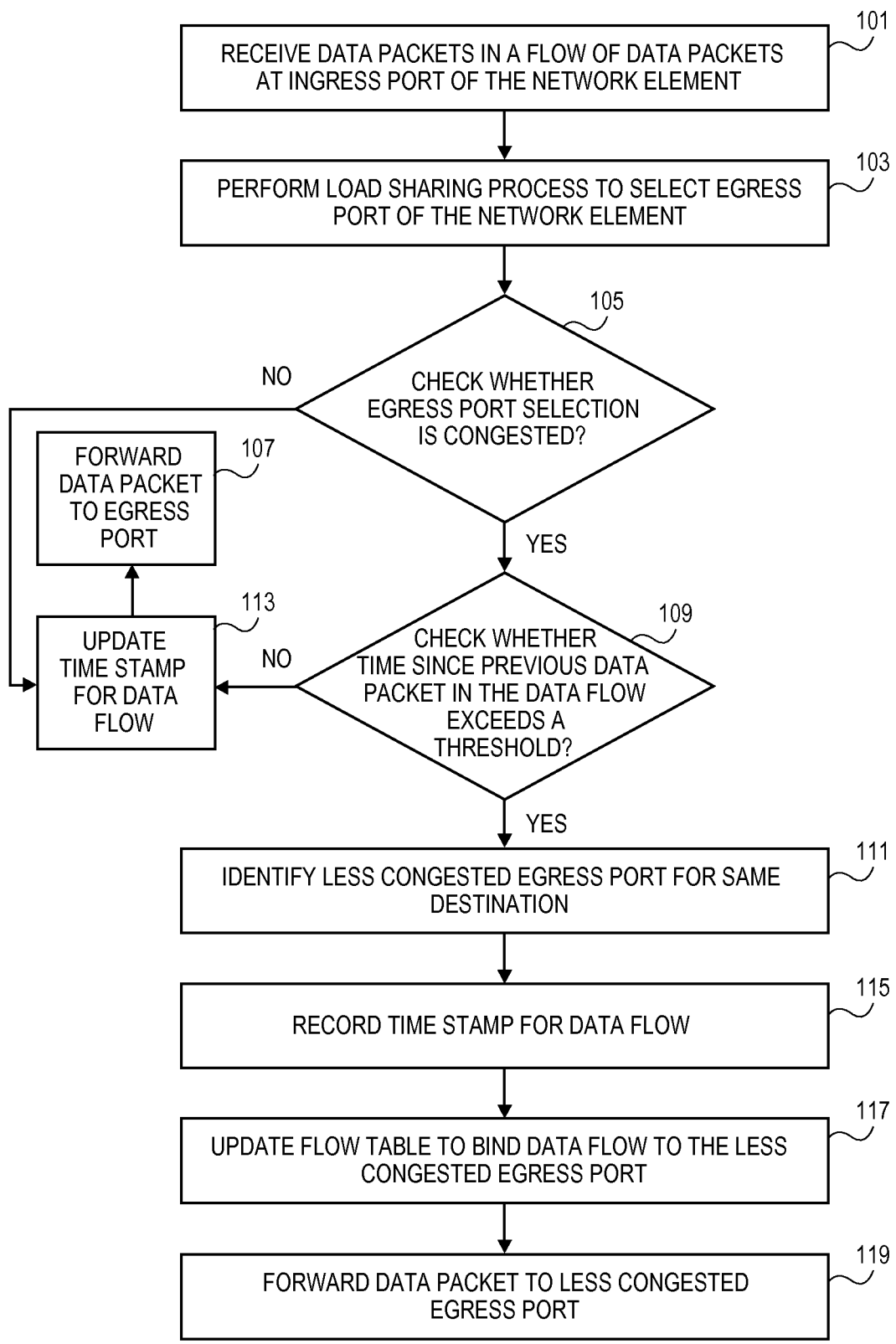
FIG. 1 is a flowchart of one embodiment of process for load balancing for a link aggregation group.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. Such electronic devices store and communicate (internally and/or with other electronic devices over a network) code and data using non-transitory tangible computer-readable storage medium (e.g., magnetic disks; optical disks; read only memory; flash memory devices; phase-change memory) and transitory computer-readable communication medium (e.g., electrical, optical, acoustical or other forms of propagated signals—such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible computer-readable medium and transitory computer-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

The following abbreviated terms are used frequently herein and provided here for convenient reference, a link aggregation group (LAG), virtual output queuing (VOQ), quantized congestion notification (QCN), congestion point (CP), congestion notification tag (CNTAG), and congestion notification message (CNM).

The embodiments of the invention provide better bandwidth utilization levels for link aggregation interfaces on switches and routers, increased throughput for the switches and routers, better overall network performance and higher user satisfaction. The embodiments provide these improvements in line with emerging networking trends, with higher bandwidth requirements, more packetization, increased machine to machine (M2M) traffic, frequent video traffic blasts, expanded internet protocol (IP) based services and similar networking trends that increase the frequency of bursty traffic between servers and end user nodes.

The disadvantages of the prior art include that although link aggregation combines ports, it is not necessarily the case that throughput will scale linearly with port count. Depending on the nature of the data traffic, the data flows may not be uniformly distributed across all the links in a link aggregation group. The result is an unbalanced load distribution across the LAG causing sub-optimal performance due to some of the links in the LAG being congested while others are underutilized.

The prior load balancing process distributed the data flows across member links of a LAG by considering only the header fields (N-Tuple) of the data flows. Typically, the egress port in the LAG for each data flow is determined by a hash function into which the N-Tuple is input. This method ensures that the consecutive packets of a flow are bound to the same member link for the duration of the flow. Thus, it prevents the packets of data flow from arriving at the destination out of order.

The drawback of the prior process is that the data flow distribution does not consider the utilization levels of the links in the LAG. It is possible that a number of data flows in the prior process are bound on the same link while other links are relatively underutilized. This uneven distribution causes the sub-optimal performance of the LAG, because data flows bound to congested links have lower throughput than would be possible if they were assigned to underutilized links of the LAG. This causes an overall reduction in the efficiency and throughput of the LAG.

The embodiments of the present invention overcome the disadvantages of the prior art Brief summary of the invention by detecting imbalanced load conditions on the member links of a LAG and moving the data flows mapped onto the overloaded links to a relatively less utilized link of the LAG. As overloaded links will be congested, the congestion on a link can be detected by use of quantized congestion notification algorithms (e.g., QCN Defined in IEEE 802.1Qau), by queue length monitoring or similar processes. In response to detecting congestion related to a link that a data flow is bound to, the embodiments identify a less congested link and migrate the data flow to that link. To ensure in order arrival, a time stamp or similar mechanism is maintained for the last data packet sent over each link. If the last data packet of a data flow was sent more than a designated amount of time previous to the current time, then it is assumed that it has arrived and the data flow can send the next packet on another link without concern for out of order arrival of data packets.

In particular embodiments, such as a VOQ based system, external port queue congestion is transferred to a VOQ port of ingress line card in a scheduled fabric system. In case of an output port getting congested, congestion will show up equally on all VOQs on each fabric access processor (FAP) on respective line cards of a network element. FAPs can implement QCN functionality such as CP monitoring to generate the QCN congestion notification message, indicating the relative congestions across different ports. In other embodiments, the VOQ can also be polled to sense congestion by checking queue length or through similar metrics. An aggregated flow states can be maintained on ingress line cards along with port binding data.

FIG. 1 is a flowchart of one embodiment of process for load balancing for a link aggregation group. In one embodiment, the process is initiated in response to the receipt of data packets in a flow of data packets at an ingress port (Block 101). The ingress port is a physical or virtual port of a network element. The ingress port can be part of a discrete line card or can be a port service by a network processor or other components of a network element. The ingress port can service any link with another network element or other computing device. The source of the data flow can be directly or indirectly connected through the link with the network element.

A load sharing process can be performed to select an egress port of the network element (Block 103). The load sharing process can be performed in conjunction with a look up in a flow table to determine a destination for the packet. The destination can be determined using the L2 and/or L3 data in the header of the received data packet. The flow table contains bindings for the data flows tying each data flow to a particular egress port that is associated with a link through which the destination can be reached. In the case where a LAG has been established to service a particular destination or next hop, any of the set of links of the LAG could be selected and the load sharing process distributes the data flows over the set of links. In one embodiment, the data packet can be the first, last or any data packet of a data flow and the process remains the same. In other embodiments, bindings are established on the first data packet and removed on the last, while the egress port is selected on the first data packet and looked-up in the flow table thereafter.

The load sharing process can perform a hash over the header information of the data packet such as the L2 and L3 header data or any data that remains constant in each data packet of a data flow. The hash value is mapped to or indexed such that a consistent corresponding egress port and its associated link of the LAG is selected. The process of load sharing can also check to determine whether the data flow associated with the data packet has already been reassigned to a less congested egress port and link in response to a previous data packet being received. This information can be stored in the flow table and in this case a hash or similar process is not needed.

A check can be made whether the selected egress port and its associated link are suffering from congestion (Block 105). The check of the egress port congestion can be based on quantized congestion data that is asynchronously or synchronously collected with relation to the load sharing process. The congestion data can be provided by the QCN process, by queue length monitoring or similar congestion monitoring. The congestion point that is monitored can be the queues or virtual queues of the line card associated with each egress port of a LAG. These line card queues can be on the ingress line card or the egress line card. The use of ingress line card congestion metrics reduced the overhead in gathering the congestion data. A further embodiment is described below where the congestion data is collected from sources external to the network element.

If the selected egress port is not congested, then the packet can be assigned to the associated queue in the ingress line card to be forwarded to the line card of the egress port over the switch fabric of the network element (Block 107). As discussed further herein below, a timestamp of the data packet can be stored in the flow table, a separate data structure or database or in a similar location (Block 113). In this case, the data flow remains bound to the current egress port and link. This can be an originally selected egress port or an egress port that was selected in response to prior detection of congestion.

If the currently selected egress port is congested, then a check is made whether the time since a previous data packet in the data flow exceeds a designated threshold (Block 109). Each data packet that is received at an ingress port or ingress line card can have a timestamp or similar indication of its arrival time recorded. The timestamp can be stored in the flow table or separate data structure or database and associated with the data flow, replacing a time stamp of the previous data packet. In this manner the time stamp of the last data packet forwarded by the ingress line card is maintained. The threshold can be any value indicating that a sufficient amount of time has elapsed since the last forwarded packet to ensure its arrival. The data flows may require in-order packet arrival and the lapse of time can ensure that the current data packet is not sent on an alternate link and arrives before the previous data packet at the destination node.

If the threshold has not been exceeded, then the data packet and data flow cannot be safely re-routed onto another link of the LAG. In this case, the data packet is forwarded to the currently selected egress port and is not re-routed despite the congestion (Block 107). In one embodiment, the time stamp of the data flow is updated (Block 113), before the data packet is forwarded. Thus, the load sharing process can be characterized as opportunistic in that it seeks to minimize the impact of re-routing by only re-routing those data flows where additional delay is not needed to ensure in-order packet arrival.

If the threshold is exceeded, then the data packet and data flow can be assigned to another link without concern for the out of order arrival. The process then continues by identifying a less congested egress port on the LAG through which the data packet can reach the same destination (Block 111). The less congested egress port can be selected by any method. In one embodiment, the less congested egress port can be selected by a comparison of the quantized congestion of each queue associated with egress ports and selecting the least congested egress port. In other embodiments, weighted averages of queue congestion or similar metrics indicating long term load, load tendency or trajectory. The time stamp for the data packet can be recorded and associated with the newly selected egress port for the data flow (Block 115). In parallel, after or before the time stamp recording, the flow table bindings for the data flow are updated to reflect the newly selected egress port for the data flow (Block 117). This data can then be utilized or referenced for subsequent data packets of the data flow. The data flow would then stay associated with this egress port and link until it becomes congested in which case the data flow could be reassigned.

The data packet is then forwarded to the less congested egress port that has been selected (Block 119). The data packet can be enqueued in the queue for the egress port, where a separate queue is established for each combination of class of service and egress port or destination. This can be the queue within the line card where the data packet awaits being forwarded to the appropriate egress line card through the switch fabric of the network element.

Figure 2:
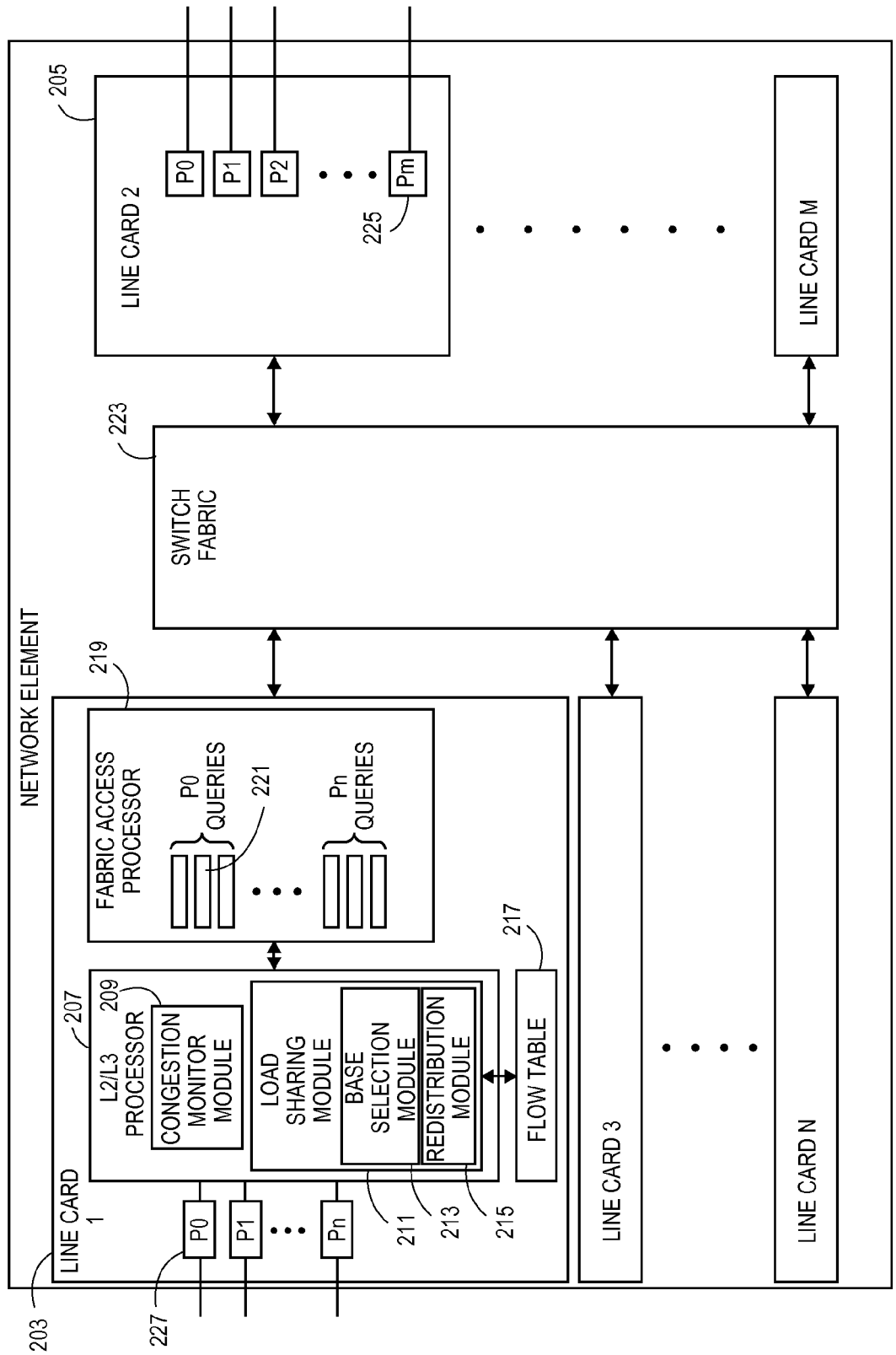
FIG. 2 is a diagram of one embodiment of a network element implementing the load balancing process and link aggregation group.

FIG. 2 is a diagram of one embodiment of a network element implementing the load balancing process and link aggregation group. The network element 201 includes a set of line cards 203, 205 that manage the processing and forwarding of data packets across the network in route to destinations in a network in which the network element operates. The network element 201 can service any number of links or physical connections with other computing devices or network elements. Each line card 203, 205 can include a number of physical or virtual ports that service these links. The line cards 203, 205 can function both to handle ingress and egress traffic. Any number of line cards 203, 205 can be supported by the network element 201. The line cards 203, 205 can be interconnected by a switch fabric 223.

The switch fabric 233 is a set of switch devices or switch cards that manage the intercommunication between line cards. In other embodiments, a bus or similar communication medium is utilized. The switch fabric 223 enables any number of line cards to communicate with one another so that each line card can forward data packets to any other line card to enable the data packet to reach its destination.

Each line card includes an L2/L3 processor 207, a fabric access processor (FAP) 221 and a flow table 217. The L2/L3 processor 207 receives the data packets from or sends the data packets to the ports 227. The ports handle the layer 1 data communication over the link with the corresponding network element or computing device. The L2/L3 processor 207 manages, amongst the other L2 and L3 processing requirements, the identification of an egress port for incoming data packets. This L2/L3 processor 207 can include a congestion monitoring module 209 and a load sharing module 211.

The load sharing module 211 determines an egress port using a hashing or similar load distribution process. The selection of the egress port can be on a data flow by data flow basis. The load sharing module 211 can be applied to any equal cost set of paths or to any LAG. The load sharing module 211 can include a base selection module 213 that performs this initial egress port selection process. The load sharing module 211 can also include a redistribution module 215 that re-assigns data flows to other egress ports and links when the assigned egress port or link is congested. The load sharing module 211 can maintain a data base or data structure of the congestion associated with each egress port or can work in combination with a separate congestion monitor module 209 to maintain current congestion information. The collection of congestion information can be done asynchronously in relation to the data flow load sharing.

The redistribution module 215 utilizes the congestion information to determine whether an egress port has congestion such that a less congested egress port can be selected to service a data flow. The redistribution module functions as described above to identify the congestion and rebalance the load by reassigning data flows on the congested egress port to other less congested egress points. The redistribution module 215 manages the timing of such data flow reassignments by maintaining timestamps for the last data packet forwarded to an egress port for each data flow. This enables the redistribution module 215 to identify when a data flow can be migrated without concern for out of order packet arrival, because the prior packet of a data flow was sent sufficiently long ago that the last data packet would have arrived at the destination or would arrive before a data packet sent on an alternate egress port. These time stamps can be stored in a discrete data structure, in the flow table or similarly stored.

The flow table 217 is a data structure that maintains binding between data flows and egress ports or links. The flow table 217 is utilized by the L2/L3 processor 207 to track which data flows are bound to each egress port or link. The flow table 217 can also include other data flow related information such as time stamps.

The FAP 219 includes a set of queues or virtual queues that hold data packets to be forwarded across the switch fabric 223 to other line cards 205 and egress ports 225. The FAP 219 can maintain separate queues 221 for each egress port, line card or similar organization of data flows. The data flows can also have a class of service or a quality of service. The FAP 219 can maintain separate queues 221 for each quality of service or class of service on a per egress point basis. Thus, each egress port 225 can have multiple queues or virtual queues associated with it. In addition to managing queues for the egress ports, the FAP can also manage the interface with the switch fabric 223 enabling the line card to exchange data packets with other line cards. The queues 221 maintained by the FAP 219 can have any number, size or organization. The FAP 219 can also work in combination with the congestion monitor module 209 to provide congestion reporting on each queue 221 managed by the FAP 219. The FAP 219 can support the congestion monitoring module 209 by sending congestion notification messages or quantified congestion notification messages. In one embodiment, the FAP 219 provides congestion information for the queues 221 to the L2/L3 module 207 within the line card 203. In other embodiments, the FAP 219 can also provide the congestion notification information to other line cards and receive congestion information from other line cards.

Figure 3:
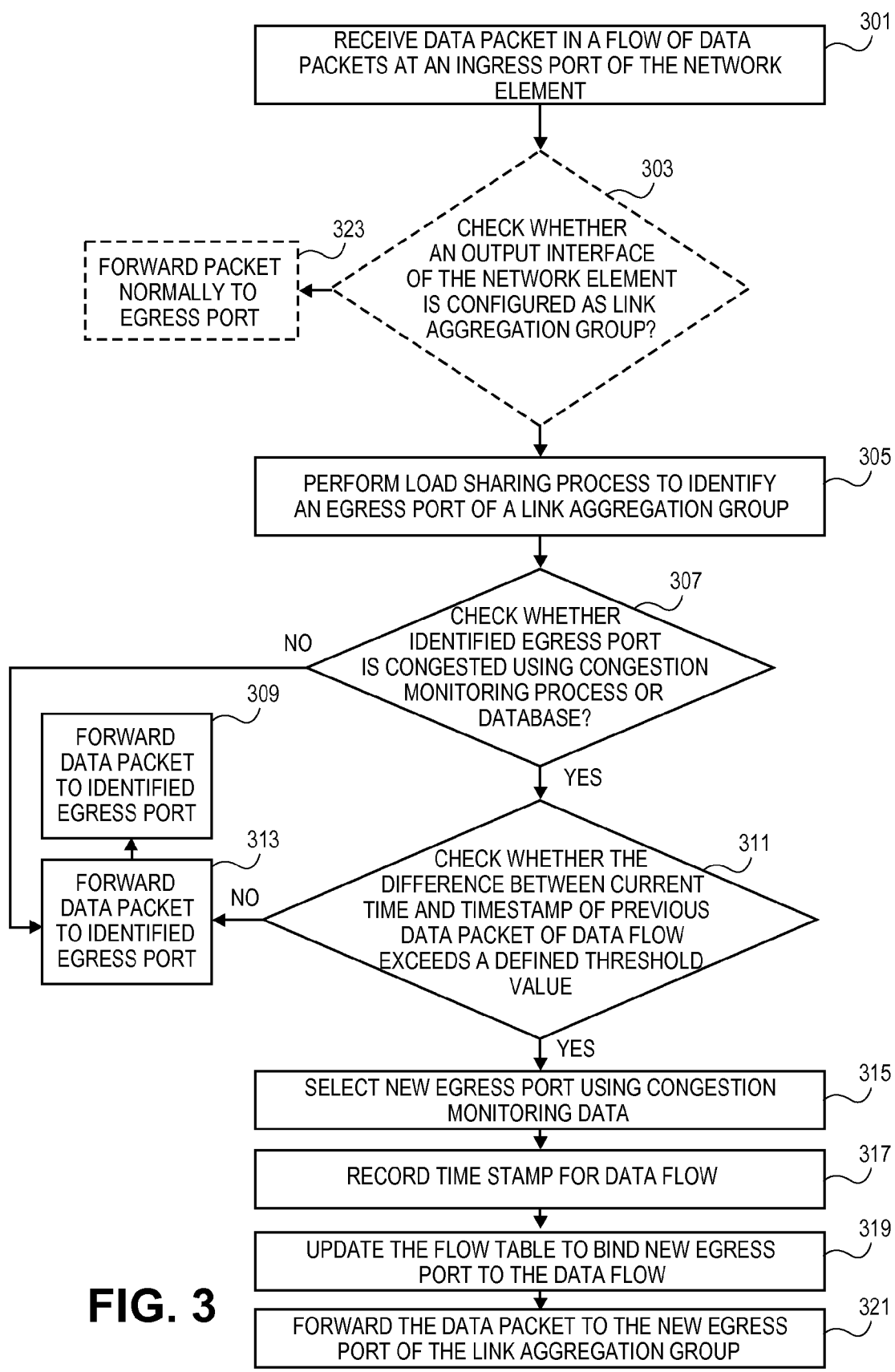
FIG. 3 is a flowchart of another embodiment of the process for load balancing for a link aggregation group.

FIG. 3 is a flowchart of another embodiment of the process for load balancing for a link aggregation group. The figure presents a particular example embodiment, the overall process can be characterized as involving two steps. Step one, detect an imbalance in the load condition on the constituent links of an aggregate interface. Step two, remap the data flows on a congested link to a relatively less loaded member link of an aggregate interface. Before addressing these steps, the congestion monitoring that supports the steps is described.

In the above system context, the queues and associated egress ports (e.g., VOQs/virtual port) can experience congestion if the data flow distribution is not uniform across the member links of the LAG. In one embodiment, a QCN mechanism defined in IEEE standard 802.1Qau can identify port getting congested by monitoring a egress port by attaching a QCN congestion point (CP) to that egress port. Alternately, the congestion can be detected by a simple polling of the queue lengths (e.g., VOQ length) at periodic intervals. The queue lengths thus obtained can be passed through a EWMA filter to eliminate the transient noise and catch the steady trend. A large queue length is an indication of persistent congestion.

In this embodiment, the QCN method is used to detect congestion. QCN has two congestion monitoring components namely a CP process and a reaction point (RP) process. The CP process can be run on the egress ports (e.g., VOQs/virtual ports) to detect congestion. Upon detecting congestion, the CP process samples a frame out of the incoming stream, generates and sends a Congestion notification message (CNM) to its source or reaction point (RP). The CNM message contains the congestion point ID (CPID), conveying the location of congestion and a measure of congestion Fb. The Fb and CPID are relevant to the load sharing and rebalancing process. In this context, the CPID corresponds to the queue (e.g., VOQ), egress port or link and Fb conveys the degree of congestion on it. Thus, by enabling QCN CPs an information base on the congestion status of the links of a LAG can be built. This information can be used to remap the data flows dynamically to less congested member links and there by achieve better throughput and network performance.

An equilibrium threshold Qeq defines the operating point of a queue under congestion conditions. In other words, Qeq is the target level around which the queue length should oscillate under normal congestion conditions. The CP computes a congestion measure Fb and with a probability depending on the severity of congestion, selects a frame from the incoming stream. If Fb is negative, it sends a feedback message to the source. Qlen is a measurement of the length of a given queue. Fb=−(Qoff+w*Qdelta), where Qoff=Qlen−Qeq and Qdelta=Qlen−Qold Fb captures a combination of queue size excess and rate excesses. So when Fb is negative the queue is oversubscribed and indicates impending congestion. The more negative the value of Fb, the greater the degree of congestion. The feedback message contains the quantized value of Fb, congestion point id (CPID) and the sampled frame is encapsulated within.

Implementing the illustrated example process requires that several constraints be taken into consideration. There is a risk of packet reordering if a data flow bound to a first link initially is moved to another link while the data flow is still active. To prevent this, a time stamp is maintained in the flow table (which can also be considered an 'aggregate' flow table, because entries may correspond to more than one flow). This timestamp records the arrival time of the most recent packet in a data flow. The decision to bind a data flow to a different egress port is dependent on this timestamp. A time threshold is defined for creating new bindings and is relatively small. A differential delay is calculated between two paths with some slack to create a merge point where packets are again serialized. With a LAG being a L2 connection, the merge point could be the very next L2 next hop. If sufficient time has elapsed from the time of the last packet's arrival, then it can be assumed that there are no packets of the data flow in-flight and it can be safely moved to a different egress port based on the congestion state. It should be noted that a number of flows can map to one entry of the flow table. The time stamp will record the most recent arrival time for any of the flows mapped to an entry. If sufficient time has elapsed, then all the flows mapped to an entry will be moved to a less congested link.

The load sharing and rebalancing process relies on QCN processing (or similar congestion monitoring) on the FAP will send the QCN CNM message with the Fb value. The Fb value is quantized such that its value gives the measure of congestion at the congestion point due to transfer of congestion from the egress point. Based on the Fb value the load sharing and rebalancing process arranges the different ports in a LAG in such a fashion that the one which is least loaded will be bound to the new data flow, in this manner the process acts to correct the imbalance gradually.

As mentioned above, the load sharing and rebalancing process relies on port bindings operations. These port binding operations rely on the flow table (i.e., an aggregate flow table). For sake of illustration, assume there is an NK deep Agregate_Flow_Table[NK] as shown below,

TABLE I

|    | Time Stamp | Bounded Port |
|----|------------|--------------|
| 1  |            |              |
| 2  |            |              |
| 3  |            |              |
| .  |            |              |
| .  |            |              |
| .  |            |              |
| .  |            |              |
| NK |            |              |

As each data packet arrives, the keys are extracted from packet header and hash it to get the index into the table shown above. This is aggregated flow table, because many flows can map to one flow bucket. The load rebalancing conditions can include a first condition that if the data flow is bounded to an egress port and the elapsed time is not more than a time threshold, continue with existing binding. A second condition can be if an elapsed time is more than a threshold and the bounded egress port is congested, or not the least loaded, then new binding can be created.

These conditions try to protect already loaded ports and not push them further to congestion collapse. This is a continuous process of load correction and can apply for heavy hitting data flow as well as light hitting data flows. As a configurable feature, if an egress port is extremely congested, then the bindings can be changed at the cost of some packet re-ordering for a short period. However, this is better than losing data packets or increasing congestion at already severely congested point.

Given the above context, returning to FIG. 3 illustrates the load sharing and rebalancing process as a flowchart. The process starts in response to receiving a data packet in a flow of data packets at an ingress port of a line card of a network element (Block 301). A check can then be made whether the output interface of the network element is configured as a link aggregation group (Block 303). If the output interface is not configured as a LAG, then the process does not apply and the data packet can be forwarded normally to an egress port (Block 323).

If the output interface is a LAG, then the process continues by performing the initial load sharing process to identify an egress port of the LAG (Block 305). This initial load sharing process identifies a egress port from the LAG using data packet information such as header information that is hashed to select the egress port. A check is then made whether the identified egress port is congested using the congestion monitoring data base built by the congesting monitoring process (Block 307). If the egress port is not congested, then the time stamp is recorded in the flow table or similar data structure (Block 313). The data packet is then forwarded to the identified egress port (Block 309).

Then the difference between the current time and the timestamp of the previous data packet of the data flow exceeds a defined threshold value (Block 311). If the threshold value is not exceeded, then the time stamp is updated in the flow table or similar data structure (Block 313). The data packet is then forwarded to the identified egress port (Block 309).

If the identified egress port is congested, then the new egress port for the data flow is selected using congestion monitoring data such as a quantized value like fb or queue length (Block 315). The time stamp is then recorded for the data packet in the flow table in the entry for the new egress port (Block 317). The flow table is also updated to bind the new egress port to the data flow (Block 319). The data packet is then forwards the data packet to the new egress port of the LAG (Block 321).

Figure 4:
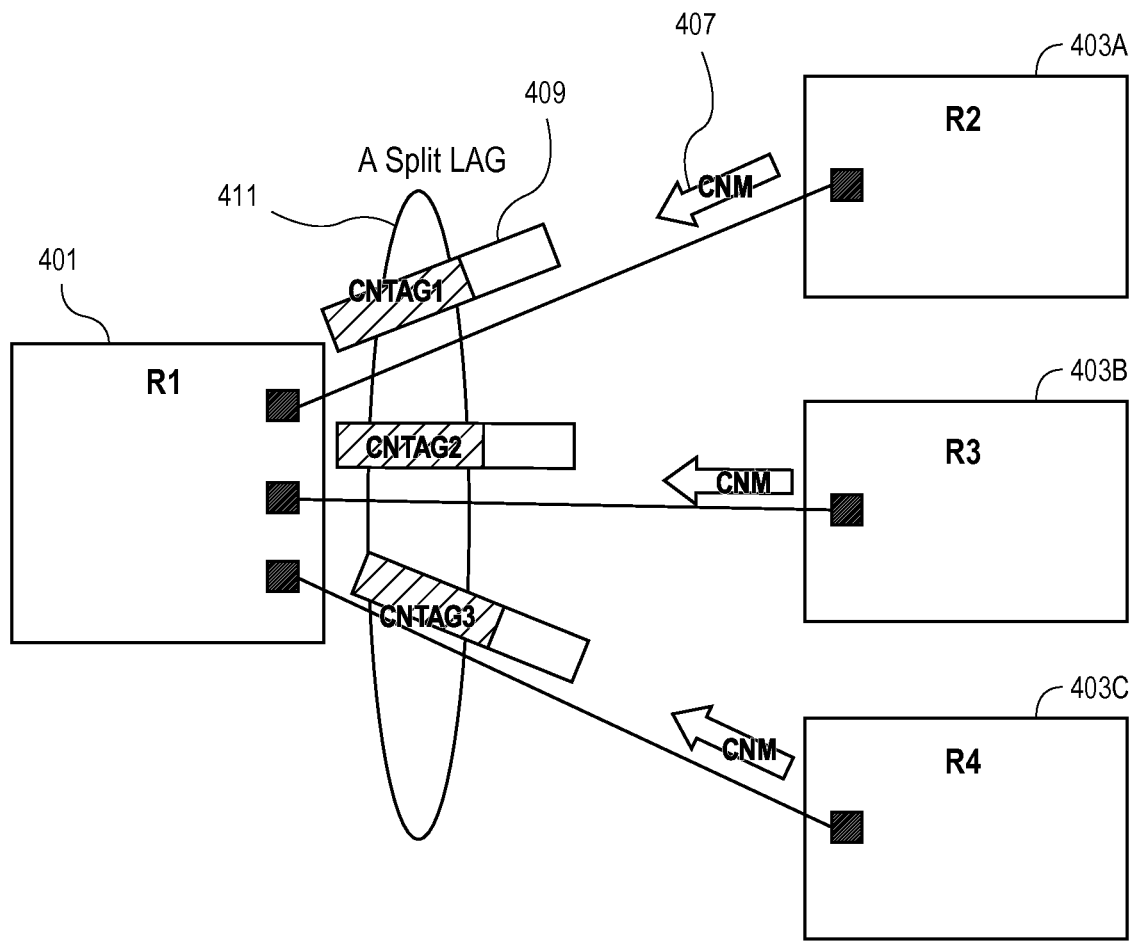
FIG. 4 is a diagram of one example embodiment of a distributed link aggregation group.

FIG. 4 is a diagram of one example embodiment of a distributed link aggregation group. In one embodiment, the congestion monitoring data is received from the next hop or similarly situated routers connected to each of the links of the LAG. Thus, a distributed implementation can provide more robust congestion information. In this embodiment, the QCN process can be used for LAG load congestion data collection. This embodiment provides a non-chassis based system.

This embodiment can be extended to networks with discrete elements wired for a load sharing scenario as shows in FIG. 4. Router R1 401 has a split LAG interface 411 to routers R2, R3 and R4 403A-403C. The traffic flows that egress the split LAG interface 411 is load shared across the member links and take different network paths to reach the destination. Consider the case where, R1 401 established congestion notification process with the other routers R2, R3, and R4 403A-C. In one example embodiment, R1 401 tags egress traffic on each of the member links with a different congestion notification tag (CNTAG) 409 and R2, R3 and R4 403A-C host congestion points downstream. In case of congestion, the CNMs 407 generated by R2, R3 and R4 403A-C can signal R1 on the congestion state of each of the paths. R1 can accordingly update its traffic congestion database and modify the flow bindings to rebalance the load across the LAG.

In other alternate embodiments, the CP process can be run on the egress ports queues also instead of the queues of the ingress line card (e.g., VOQs). Congestion can also be sensed from queue length polling and by using an exponentially weighted moving average (EWMA) engine.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element to improve load sharing for a link aggregation group by redistributing data flows to less congested ports in a set of ports associated with the link aggregation group, the method comprising the steps of:
   receiving a data packet in a data flow at an ingress port of the network element, the data packet having a destination external to the network element;
   performing a load sharing process to select an egress port of the network element;
   checking whether the selected egress port is congested;
   if the selected egress port is congested, then checking whether a time elapsed since a previous data packet in the data flow was received exceeds a threshold value, where the threshold value is an amount of time determined to ensure the previous data packet is able to reach the destination;
   if the elapsed time exceeds the threshold value, then:
      identifying a less congested egress port in the set of ports;
      updating a flow table to bind the data flow to the less congested egress port; and
      forwarding the data packet to the less congested egress port.

2. The method of claim 1, further comprising:
   storing a timestamp of the data packet in the flow table for comparison with subsequent data packet arrival times.

3. The method of claim 1, wherein the load sharing process further comprises the steps of:
   hashing header data of the data packet to generate an identifier; and
   looking-up the identifier in the flow table to obtain the selected egress port.

4. The method of claim 1, wherein checking whether the selected egress port is congested comprises the steps of:
   checking a congestion database to obtain a quantized congestion value or queue length; and
   comparing the quantized congestion value to another threshold value.

5. The method of claim 1, further comprising the steps of:
   checking a queue associated with the selected egress port using a congestion notification process that reports a quantized congestion value; and
   recording the quantized congestion value in a congestion database.

6. The method of claim 1, further comprising the steps of:
   checking a queue length of a queue associated with the selected egress port; and
   recording the queue length in a congestion database.

7. The method of claim 1, further comprising the steps of:
   retrieving a timestamp of the previous data packet for the data flow; and
   comparing the timestamp of the previous data packet with a timestamp of the data packet to determine the time since the previous data packet was received.

8. The method of claim 1, wherein identifying the less congested egress port in the set of ports comprises the steps of:
   selecting a replacement egress port having a lowest congestion measurement value or a shortest queue length.

9. The method of claim 1, further comprises the steps of:
   checking a quantized congestion value for a router associated with the selected egress port reported using a congestion notification process; and
   recording the quantized congestion value in a congestion database.

10. A method implemented by a network element to improve load sharing for a link aggregation group by redistributing data flows to less congested ports in a set of ports associated with the link aggregation group, the method comprising the steps of:
    receiving a data packet in a data flow at an ingress port of the network element, the data packet having a destination external to the network element;
    performing a load sharing process to select an egress port of the network element;
    checking whether the selected egress port is congested using a congestion monitoring database;
    if the selected egress port is congested, then checking whether a time difference between a current time and a time stamp of a previous data packet in the data flow exceeds a threshold value, the threshold value being an amount of time determined to ensure the previous data packet is able to reach the destination;
    if the time difference exceeds the threshold value, then:
       selecting a new egress port in the set of ports of the link aggregation group using congestion monitoring data;
       updating a flow table to bind the data flow to the new egress port; and
       forwarding the data packet to the new egress port of the link aggregation group.

11. A network element to improve load sharing for a link aggregation group by redistributing data flows to less congested ports in a set of ports associated with the link aggregation group, the network element comprising:
    a first line card including a set of ports configured as part of the link aggregation group;
    a switch fabric coupled to the first line card, the switch fabric configured to enable communication between line cards of the network element; and
    a second line card coupled to the switch fabric, the second line card including a set of ports, a L2 and L3 processor and a fabric access processor, the set of ports configured to receive a data packet in a data flow, the data packet having a destination external to the network element;
    the L2 and L3 processor configured to:
       perform a load sharing process to select an egress port of the link aggregation group,
       check whether the selected egress port is congested using a congestion monitoring database,
       if the selected egress port is congested, check whether a time difference between a current time and a time stamp of a previous data packet in the data flow exceeds a threshold value that is an amount of time determined to ensure the previous data packet is able to reach the destination,
       if the time difference exceeds the threshold value, then select a new egress port in the set of ports of the link aggregation group using congestion monitoring data, and
       update a flow table to bind the data flow to the new egress port,
    and the fabric access processor to forward the data packet to the new egress port of the link aggregation group.

12. The network element of claim 11, further comprising:
    the flow table coupled to the L2 and L3 processor, the flow table to store a timestamp of the data packet for comparison with subsequent data packet arrival times.

13. The network element of claim 11, wherein the L2 and L3 processor is further configured to hash header data of the data packet to generate an identifier, and look-up the identifier in the flow table to obtain the selected egress port.

14. The network element of claim 11, wherein the L2 and L3 processor is further configured to check whether the selected egress port is congested by, checking a congestion database to obtain a quantized congestion value or queue length, and comparing the quantized congestion value to another threshold value.

15. The network element of claim 11, wherein the L2 and L3 processor is further configured to check a queue associated with the selected egress port using a congestion notification process that reports a quantized congestion value, and to record the quantized congestion value in a congestion database.

16. The network element of claim 11, wherein the L2 and L3 processor is further configured to check a queue length of a queue associated with the selected egress port, and record the queue length in a congestion database.

17. The network element of claim 11, wherein the L2 and L3 processor is further configured to retrieve a timestamp of the previous data packet for the data flow, and to compare the timestamp of the previous data packet with a timestamp of the data packet to determine the time since the previous data packet was received.

18. The network element of claim 11, wherein the L2 and L3 processor is further configured to identifying the less congested egress port in the set of ports by selecting a replacement egress port having a lowest congestion measurement value or a shortest queue length.

19. The network element of claim 11, wherein the L2 and L3 processor is further configured to check a quantized congestion value for a router associated with the selected egress port reported using a congestion notification process, and to record the quantized congestion value in a congestion database.

* * * * *